(12) United States Patent
Zhang et al.

(10) Patent No.: US 11,688,389 B2
(45) Date of Patent: Jun. 27, 2023

(54) METHOD FOR PROCESSING VOICE SIGNALS AND TERMINAL THEREOF

(71) Applicant: BEIJING DAJIA INTERNET INFORMATION TECHNOLOGY CO., LTD., Beijing (CN)

(72) Inventors: Xiaobo Zhang, Beijing (CN); Qi Zhang, Beijing (CN); Zhou Zhou, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 252 days.

(21) Appl. No.: 17/011,916

(22) Filed: Sep. 3, 2020

(65) Prior Publication Data

US 2021/0065687 A1 Mar. 4, 2021

(30) Foreign Application Priority Data

Sep. 3, 2019 (CN) .......................... 201910829645.9

(51) Int. Cl.
*G10L 15/08* (2006.01)
*G06F 3/16* (2006.01)
*H04L 67/10* (2022.01)
*H04W 52/02* (2009.01)
*H04L 65/75* (2022.01)

(52) U.S. Cl.
CPC ................ *G10L 15/08* (2013.01); *G06F 3/16* (2013.01); *H04L 65/75* (2022.05); *H04L 67/10* (2013.01); *H04W 52/0229* (2013.01); *G10L 2015/088* (2013.01)

(58) Field of Classification Search
None
See application file for complete search history.

(56) References Cited

U.S. PATENT DOCUMENTS

| 7,668,968 B1 * | 2/2010 | Smith ................... H04L 65/752 370/231 |
| 2016/0372112 A1 * | 12/2016 | Miller ................... H04L 51/066 |
| 2017/0092269 A1 * | 3/2017 | Haubrich ............. H04R 25/554 |
| 2019/0080374 A1 * | 3/2019 | Alvarez ............. G06Q 30/0601 |
| 2019/0139547 A1 | 5/2019 | Wu et al. |
| 2019/0189117 A1 * | 6/2019 | Kumar ................ G06F 16/3329 |

(Continued)

FOREIGN PATENT DOCUMENTS

| CN | 107591151 A | 1/2018 |
| CN | 108335696 A | 7/2018 |

(Continued)

OTHER PUBLICATIONS

First office action of Chinese application No. 201910829645.9 dated Aug. 3, 2021.

*Primary Examiner* — Stella L. Woo
(74) *Attorney, Agent, or Firm* — Knobbe, Martens, Olson & Bear, LLP

(57) ABSTRACT

Disclosed is a method for processing a voice signal applicable to a terminal. The method can include: receiving a first voice signal; sending the first voice signal to a server in response to determining that the first voice signal includes a preset wake-up word; and receiving a second voice signal in response to receiving an acknowledgement result from the server, and responding to an interaction instruction corresponding to the second voice signal in a live streaming room.

18 Claims, 7 Drawing Sheets

(56) References Cited

U.S. PATENT DOCUMENTS

2020/0145616 A1* 5/2020 Nassar .................. H04M 3/567
2020/0202849 A1* 6/2020 Cartwright .............. G06F 3/167

FOREIGN PATENT DOCUMENTS

| CN | 109147779 A | 1/2019 |
| CN | 109378000 A | 2/2019 |
| CN | 109871238 A | 6/2019 |
| CN | 110176235 A | 8/2019 |

* cited by examiner

METHOD FOR PROCESSING VOICE SIGNALS AND TERMINAL THEREOF

CROSS-REFERENCE TO RELATED APPLICATION

This application is based on and claims priority under 35 U.S.C. 119 to Chinese patent application No. 201910829645.9, filed on Sep. 3, 2019, in the China National Intellectual Property Administration, the disclosures of which are herein incorporated by reference in its entirety.

TECHNICAL FIELD

The present disclosure relates to the field of voice signal processing technologies, and in particular, relates to a method for processing a voice signal and a terminal thereof.

BACKGROUND

Currently, webcasting has become a very common network behavior in people's lives. Almost everyone has been exposed to webcasting, and more and more people live stream or watch live streams over the Internet by live streaming applications.

When live streaming, users generally need to frequently use various functions of the live streaming application, such as a microphone-connecting function, a music-playing function, and a gift-giving function, and the users often perform live streaming actions, such as dancing and singing. As a result, during the live streaming, the users generally need to manually operate to implement various functions of the live streaming application frequently, and such manual operations on the terminal may cause a lot of inconvenience to the users.

SUMMARY

Embodiments of the present disclosure provide a method for processing a voice signal and a terminal thereof. The technical solutions are as follows.

According to an aspect of the embodiments of the present disclosure, a method for processing a voice signal, applicable to a terminal, is provided. The method includes:

receiving a first voice signal when an interaction interface of a live streaming room is in a display state;

sending the first voice signal to a server in response to determining that the first voice signal includes a preset wake-up word;

receiving a second voice signal in response to receiving an acknowledgement result from the server, wherein the acknowledgement result is intended to indicate that the server determines that the first voice signal includes the preset wake-up word; and responding to an interaction instruction corresponding to the second voice signal in the live streaming room.

According to another aspect of the embodiments of the present disclosure, a method for processing a voice signal, applicable to a server, is provided. The method includes:

receiving a plurality of second data packets from a terminal, wherein each of the plurality of second data packets carries a sequence identifier;

splicing the plurality of second data packets according to sequences identified by the sequence identifiers carried by the plurality of second data packets to acquire a first voice signal; and generating an acknowledgement result in response to determining that the first voice signal includes a preset wake-up word, wherein the acknowledgement result is intended to indicate that the server determines that the first voice signal includes the preset wake-up word; and sending the acknowledgement result to the terminal.

According to a still another aspect of the embodiments of the present disclosure, a terminal is provided. The terminal includes:

a processor; and a memory configured to store a computer program;

wherein the processor, when running the computer program, is enabled to perform the following operations:

receiving a first voice signal when an interaction interface of a live streaming room is in a display state;

sending the first voice signal to a server in response to determining that the first voice signal includes a preset wake-up word;

receiving a second voice signal in response to receiving an acknowledgement result from the server, wherein the acknowledgement result is intended to indicate that the server determines that the first voice signal includes the preset wake-up word; and responding to an interaction instruction corresponding to the second voice signal in the live streaming room.

BRIEF DESCRIPTION OF THE DRAWINGS

The accompanying drawings, which are incorporated in and constitute a part of this description, illustrate embodiments consistent with the present disclosure, and together with the description, serve to explain the principles of the present disclosure, and do not constitute any improper limitation to the present disclosure.

DETAILED DESCRIPTION

For better understanding of the technical solutions of the present disclosure by persons of ordinary skill in the art, the following clearly and completely describes the technical solutions in embodiments of the present disclosure with reference to the accompanying drawings.

It should be noted that the terms "first", "second" and the like in the description, the claims and the above accompanying drawings of the present disclosure are used for distinguishing similar objects and not necessarily for describing a specific sequential or chronological order. It should be understood that the terms so used are interchangeable under appropriate circumstances and that the embodiments of the present disclosure described herein can be implemented in other sequences in addition to those described or illustrated herein. The implementation modes set forth in the following description of example embodiments do not represent all implementation modes consistent with the present disclosure. Instead, these embodiments are merely examples of apparatuses and methods consistent with aspects related to the disclosure as recited in the appended claims.

For improving the convenience of a user to operate a terminal during the webcasting, the embodiments of the present disclosure provide a method and apparatus for processing a voice signal, and a terminal, a server, and a computer-readable storage medium thereof.

The method for processing the voice signal according to the embodiment of the present disclosure is applicable to a terminal on which a live streaming application is mounted. The following firstly introduces the method for processing the voice signal.

Figure 1:
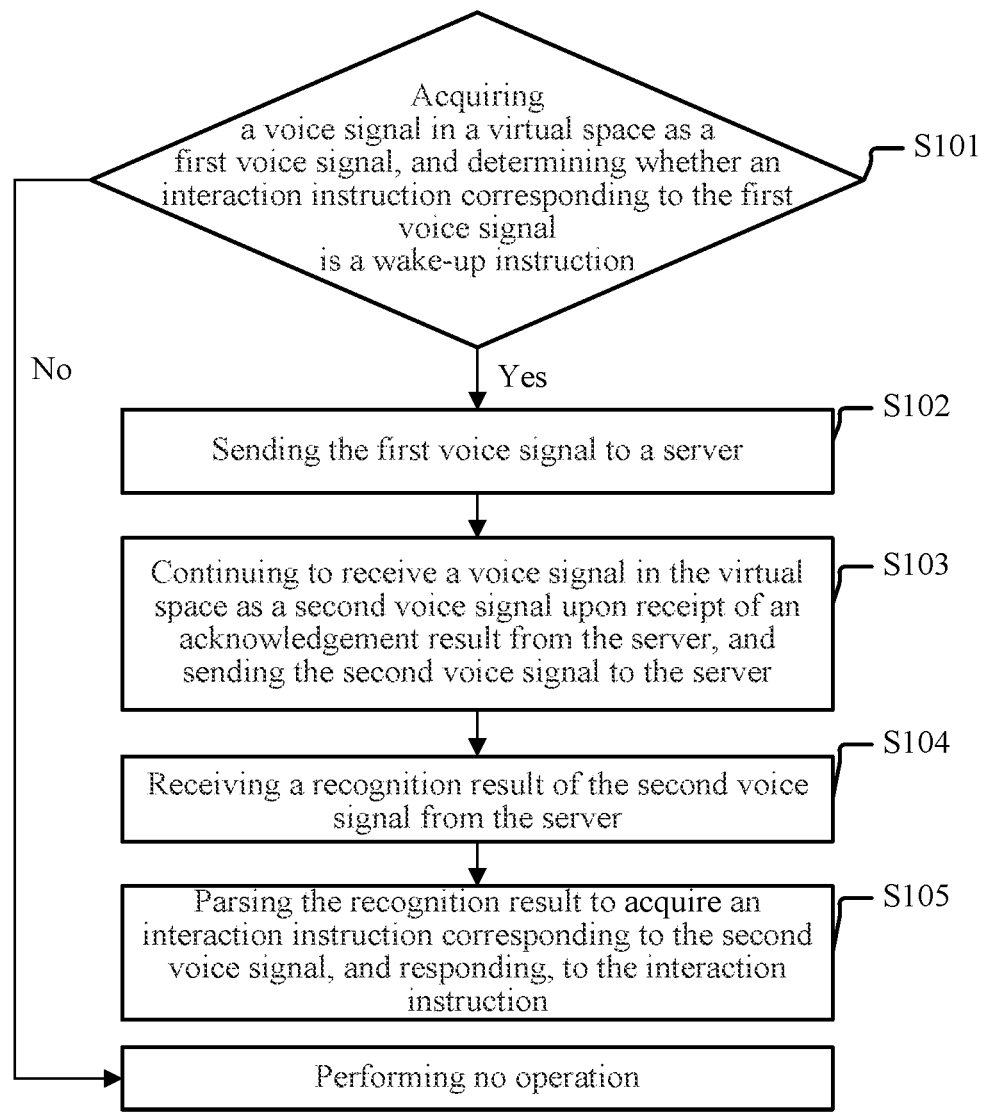
FIG. 1 is a flowchart of a method for processing a voice signal according to an example embodiment.

As shown in FIG. 1, a method for processing a voice signal, applicable to a terminal, includes the following steps.

In step S101, the terminal acquires a voice signal in a virtual space as a first voice signal, and determines whether an interaction instruction corresponding to the first voice signal is a wake-up instruction. If the interaction instruction is a wake-up instruction, step S102 is performed; and otherwise, no operation is performed.

The virtual space is configured for a real-time video behavior, i.e., a live streaming behavior. In one embodiment, the virtual space is a live streaming room. In one embodiment, acquiring the first voice signal in the virtual space as the first voice signal includes: receiving the first voice signal when an interaction interface of a live streaming room is in a display state. The terminal determines whether the interaction instruction corresponding to the first voice signal is the wake-up instruction by determining whether the first voice signal includes a preset wake-up word.

In step S101, description is given with an example that the interaction instruction corresponding to the first voice signal is not the wake-up instruction and no operation is performed. In one embodiment, when the terminal determines that the interaction instruction corresponding to the first voice signal is not the wake-up instruction, the terminal continues to receive voice signals until the terminal receives a first voice signal of which the corresponding interaction instructions is the wake-up instruction, and step S102 is performed.

In step S102, the terminal sends the first voice signal to a server.

In step S103, upon receipt of an acknowledgement result from the server, the terminal continues to receive a voice signal in the virtual space as a second voice signal, and sends the second voice signal to the server.

The acknowledgement result is intended to indicate that the server determines that the interaction instruction corresponding to the first voice signal is the wake-up instruction. In addition, the server determines whether the interaction instruction corresponding to the first voice signal is the wake-up instruction by determining whether the first voice signal includes the preset wake-up word.

In step S104, the terminal receives a recognition result of the second voice signal from the server.

In step S105, the terminal parses the recognition result to acquire an interaction instruction corresponding to the second voice signal, and responds to the interaction instruction.

In one embodiment, parsing the recognition result by the terminal means the terminal determining the interaction instruction based on the recognition result. In addition, as the second voice signal is acquired in the virtual space, the terminal may respond to the interaction instruction in the virtual space. This step includes: the terminal determines the interaction instruction based on the second voice signal and responds to the interaction instruction in the virtual space.

It can be seen that in the solution according to the embodiment of the present disclosure, the terminal acquires the voice signal in the virtual space as the first voice signal, and determines whether the interaction instruction corresponding to the first voice signal is the wake-up instruction.

If determining that the interaction instruction corresponding to the first voice signal is the wake-up instruction, the terminal sends the first voice signal to the server; upon receipt of the acknowledgement result from the server, the terminal continues to receive the voice signal in the virtual space as the second voice signal, and sends the second voice signal to the server, wherein the acknowledgement result is intended to indicate that the server determines that the interaction instruction corresponding to the first voice signal is the wake-up instruction; the terminal receives the recognition result of the second voice signal from the server; and the terminal parses the recognition result to acquire the interaction instruction corresponding to the second voice signal, and responds to the interaction instruction.

As in the virtual space, the user can operate the terminal by sending the voice signal without manually operating the terminal frequently, the convenience of operating the terminal in the webcasting process is greatly improved. Moreover, since the terminal may send the first voice signal to the server upon determining that the interaction instruction corresponding to the first voice signal is the wake-up instruction, and continues to receive the voice signal in the virtual space upon receipt of the acknowledgement result from the server, the wake-up instruction may be recognized accurately even in a noisy live streaming environment by double acknowledgements by the terminal and the server, thereby increasing the recognition accuracy rate of the wake-up instruction.

When live streaming or watching a live streaming with a live streaming application mounted on the terminal, the user can send various voice signals and the terminal acquires the voice signal in the virtual space as the first voice signal. The virtual space is configured for the real-time video behavior, i.e., the live streaming behavior, and is the live streaming room. The terminal acquires the first voice signal above by its own microphone and other devices.

As the user does not necessarily need to operate the terminal when sending the voice signal, in order to determine whether the user needs to operate the terminal, in step S101 above, after acquiring the first voice signal in the virtual space, the terminal firstly determines whether the interaction instruction corresponding to the first voice signal is the wake-up instruction. The wake-up instruction is a voice instruction that awakens the function of voice operating the terminal.

Before the terminal receives the wake-up instruction, the function of voice operating the terminal is in a dormant state.

At this time, the terminal continues to acquire voice signals from the user, but does not need to respond to them. When the terminal receives the first voice signal of which the corresponding interaction instruction is the wake-up instruction, it indicates that the user wants to activate the function of voice operating the terminal, and then the function of voice operating the terminal enters a working state.

Figure 2:
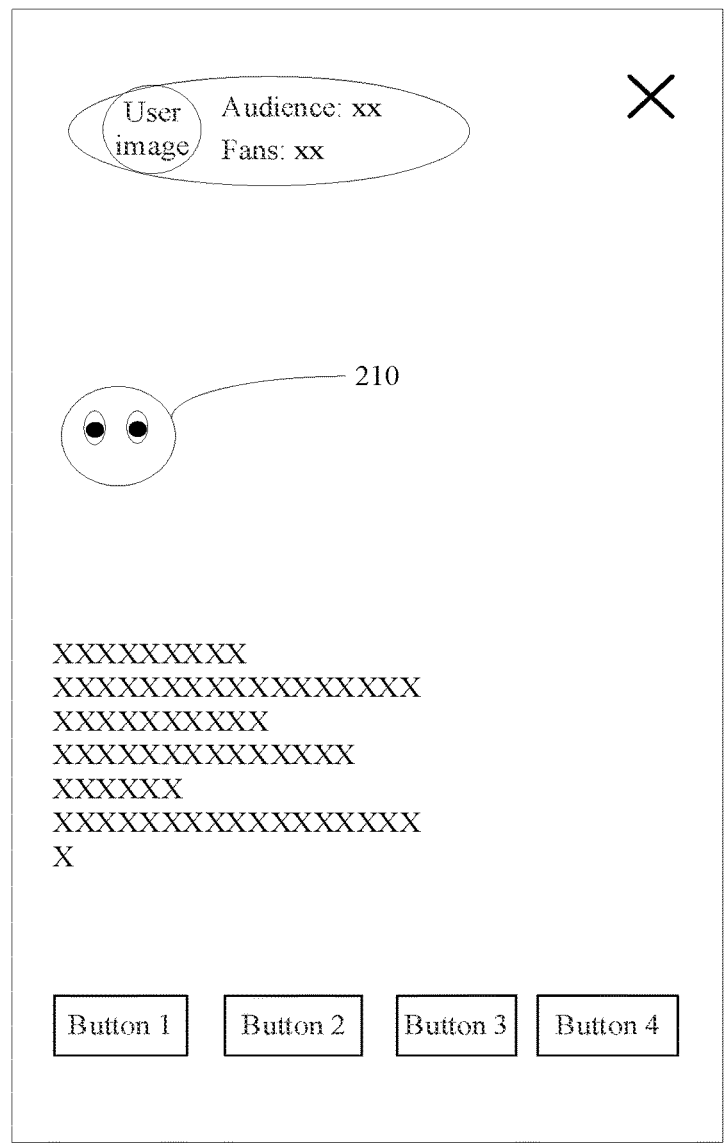
FIG. 2 is a diagram of an interaction interface of a live streaming room according to an example embodiment.

In order to inform the user of the state of the function of voice operating the terminal and thus facilitate operation of the terminal by the user, a preset icon is displayed in the interaction interface of the live streaming room displayed by the terminal. The preset icon is intended to identify the state of the function of voice operating the terminal. For example, the interaction interface of the live streaming room is as shown in FIG. 2, a preset icon 210 identifies the state of the function of voice operating the terminal. For example, when a cartoon character in the preset icon is in a sleep state, the preset icon is intended to identify that the function of voice operating the terminal is in the dormant state; and when the cartoon character in the preset icon is in a waking state, the preset icon is intended to identify that the function of voice operating the terminal is in the working state.

In one embodiment, the terminal performs voice recognition on the first voice signal and determines its semantic information. If the semantic information includes the preset wake-up word, the terminal determines that the interaction instruction corresponding to the first voice signal is the wake-up instruction. The wake-up words are preset words configured to awaken the function of voice operating the terminal. For example, the wake-up words are "Xiao Kuai, Xiao Kuai", "Hi, Xiao Kuai", "Xiao Kuai, wake up", and the like.

For a live streaming scenario, the environment is noisy and the recognition of the voice signal by the terminal may not be accurate. Therefore, in order to accurately determine whether the interaction instruction corresponding to the first voice signal is the wake-up instruction, a dual wake-up system (DWS) is adopted to determine whether the interaction instruction corresponding to the first voice signal is the wake-up instruction. DWS is a mechanism adopting a local recognition model and a remote recognition model. In one embodiment, by using the local recognition model, the terminal identifies the wake-up word in the voice signal from the user and then sends the voice signal to a remote server. The server is provided with a more accurate wake-up word recognition model for the secondary recognition and acknowledgement of the wake-up word and returns the acknowledgement result to the terminal.

As such, the terminal sends the first voice signal to the server after determining that the interaction instruction corresponding to the first voice signal is the wake-up instruction. Upon receipt of the first voice signal, the server performs voice recognition on the first voice signal and determines its semantic information. If the semantic information includes the preset wake-up word, the server determines that the interaction instruction corresponding to the first voice signal is the wake-up instruction. At this time, the server sends the acknowledgement result to the terminal. The acknowledgement result is intended to indicate that the server determines that the interaction instruction corresponding to the first voice signal is the wake-up instruction.

In one embodiment, if the semantic information does not include the preset wake-up word, the server determines that the interaction instruction corresponding to the first voice signal is not the wake-up instruction. At this time, the server sends a non-acknowledge result to the terminal. The non-acknowledgement result is intended to indicate that the server determines that the interaction instruction corresponding to the first voice signal is not the wake-up instruction or instruct the server not to perform a feedback operation.

Further, in step S103 above, when the terminal receives the acknowledgement result from the server, it indicates that the user wants to operate the terminal over a voice. At this time, the terminal controls the function of voice operating the terminal to enter the working state so as to continue to receive the voice signal in the virtual space as the second voice signal and respond to the interaction instruction corresponding to the second voice signal in the live streaming room.

In one embodiment, responding to the interaction instruction corresponding to the second voice signal in the live streaming room includes:

determining the interaction instruction based on the second voice signal, and responding to the interaction instruction in the live streaming room.

In one embodiment, the terminal locally determines the interaction instruction based on the second voice signal or determines the interaction instruction based on the second voice signal. In response to determining the interaction instruction via the server based on the second voice signal, the terminal sends the second voice signal to the server upon receipt of the second voice signal.

Upon receipt of the second voice signal from the terminal, the server determines the recognition result based on the second voice signal, and sends the recognition result to the terminal.

The server recognizes voice from the second voice signal, determines semantic information thereof, then determines a recognition result according to the semantic information, and finally sends the recognition result to the terminal. As such, in step S104 above, the terminal receives the recognition result from the server. The recognition result includes an operation command and an operation object. Determining the recognition result based on the voice information includes: determining the operation command and the operation object according to the semantic information, and determining the recognition result according to the operation command and the operation object.

Further, the terminal parses the recognition result to acquire the interaction instruction corresponding to the second voice signal, and responds to the interaction instruction. That is, step S105 is performed. Upon receiving the above recognition result, in order to determine an operation that the user needs to perform, the terminal parses the recognition result to acquire the interaction instruction corresponding to the second voice signal. The interaction instruction is such an instruction that instructs the terminal to take a corresponding action, such as play music, activate a beautifying function, and activate a microphone-connecting function. The terminal then responds to the interaction instruction to implement various functions in the live streaming room that the user needs to execute.

Figure 3:
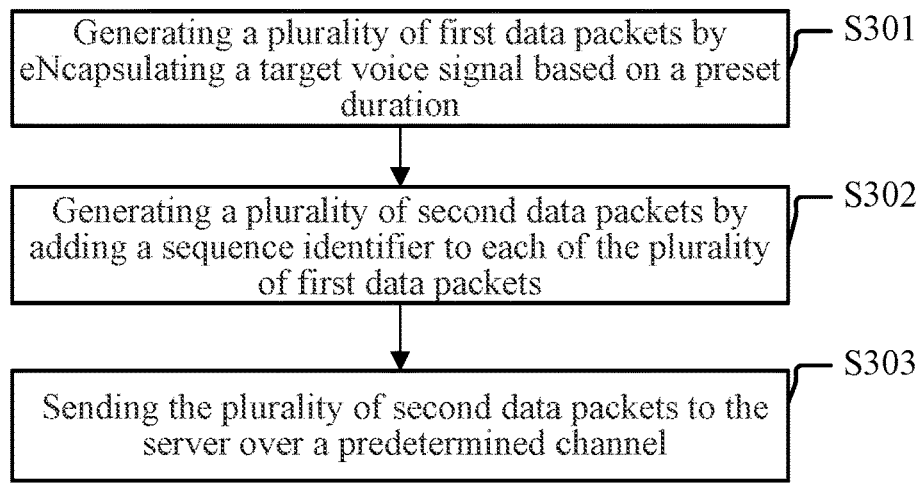
FIG. 3 is a flowchart of sending a target voice signal according to an example embodiment.

In some embodiments, as shown in FIG. 3, sending the target voice signal to the server includes the following steps.

In step S301, the terminal generates a plurality of first data packets by encapsulating the target voice signal based on a preset duration.

The target voice signal is the first voice signal or the second voice signal above. That is, the terminal may send a voice signal to the server in this way.

The terminal pre-processes the target voice signal, for example, encodes the voice signal, which is not specifically limited here. Next, the terminal encapsulates the target voice signal into the plurality of first data packets based on the preset duration which is determined according to a network condition, the length of a general voice signal and other factors. For example, the preset duration is 100 milliseconds, 120 milliseconds, 150 milliseconds, or the like, which is not specifically limited herein.

In S302, the terminal generates a plurality of second data packets by adding a sequence identifier to each of the first data packets.

In order to enable the server to successfully splice the plurality of second data packets back into the target voice signal conveniently after the server receives the second data packets, the terminal adds the sequence identifier to each of the plurality of first data packets. The sequence identifier uniquely identifies the sequence of a data packet.

In one embodiment, the terminal generates the plurality of first data packets by encapsulating the target voice signal, and then generates the plurality of second data packets by adding sequence identifiers 1, 2, . . . , N to the plurality of first data packets respectively according to the sequential order of the first data packets corresponding to the target voice signal, where N is the number of first data packets.

In S303, the terminal sends the plurality of second data packets to the server over a predetermined channel.

After adding the sequence identifier to each of the plurality of first data packet, the terminal sends the plurality of second data packets to the server. The predetermined channel may be any channel. In some embodiments, step S303 includes: sending the plurality of second data packets to the server.

In some embodiments, the terminal sends the plurality of second data packets to the server over the predetermined channel, which is a dedicated channel for sending voice signals and voice signal recognition results between the terminal and the server.

In some embodiments, the above predetermined channel is a dedicated socket channel provided by a socket audio service (SAS). As such, the data transmission between the terminal and the server is faster and more stable.

It should be noted that after generating the plurality of second data packets by adding the sequence identifier to each of the plurality of first data packets, the terminal sends the plurality of second data packets to the server, and the plurality of second data packets may be sent before the plurality of first data packets are all added with sequence identifiers. It can be seen that in this embodiment, the terminal generates the plurality of first data packets by encapsulating the target voice signal based on the preset duration, then generates the plurality of second data packets by adding the sequence identifiers to the plurality of first data packets respectively, and further sends the plurality of second data packets to the server over the predetermined channel. As such, the terminal generates the plurality of first data packets by encapsulating the target voice signal and then generates the plurality of second data packets by adding the sequence identifiers, and thus the terminal may successively send the plurality of second data packets to the server, rather than waiting for the end of the target voice signal and then sending all the plurality of second data packets to the server. In this way, the server starts to process the target voice signal upon receipt of the second data packets, which may shorten the user's waiting time, ensure faster and more stable data transmission between the terminal and the server, thus improve the user experience.

In some embodiment, continuing to receive a voice signal in the virtual space as the second voice signal upon receipt of the acknowledgement result from the server includes: upon receipt of the acknowledgement result from the server, outputting wake-up success prompt information, acquiring a voice signal input by the user in the virtual space based on the wake-up success prompt information, and determining the second voice signal based on the voice signal input by the user.

When the terminal receives the acknowledgement result from the server, it indicates that the user wants to operate the terminal over the voice. In order to inform the user that various functions of the live streaming room may be realized by voice control on the live streaming room at this time, the terminal outputs the wake-up success prompt information.

For example, if the interaction interface of the live streaming room is as shown in FIG. 2, the terminal changes the state of the cartoon character to indicate that the function of voice controlling function of the live streaming room has been awakened. For example, the terminal controls the cartoon character to blink, smile, and jump to indicate that the function of voice controlling function of the live streaming room has been awakened.

For example again, the terminal outputs text prompt information to identify the function of voice controlling function of the live streaming room has been awakened. For example, the text prompt information is that "A voice assistant has been enabled", "Please issue a voice command", "Hi, you can control various functions of the live streaming room by voices" and the like.

After the user learns that the function of voice controlling the live streaming room function is activated, the user can continue to send the voice signal, which is the second voice signal. After acquiring the second voice signal, the terminal can send it to the server to recognize the second voice signal, and then determine an operation that the user needs to perform.

It can be that in this embodiment, upon receipt of the acknowledgement result from the server, the terminal outputs the wake-up success prompt information; and then acquires the voice signal input by the user in the virtual space based on the wake-up success prompt information as the second voice signal. As such, the terminal can prompt the user to control the live streaming room by voices so as to implement various functions of the live streaming room, thereby achieving better user experience.

In some embodiments, the recognition result includes an operation command and an operation object. Parsing the recognition result to acquire the interaction instruction corresponding to the second voice signal and responding to the interaction instruction includes:

parsing the recognition result to acquire the operation command and the operation object, and performing an action corresponding to the operation command on the operation object.

In one embodiment, responding to the interaction instruction includes: determining an operation command and an operation object based on the interaction instruction, and controlling the operation object to perform a corresponding operation in the live streaming room according to the operation command, wherein the operation command corresponds to each function in the live streaming room.

The interaction instruction includes an operation command or an operation command identifier. Determining the operation command based on the interaction instruction in response to determining that the interaction instruction includes the operation command identifier includes: determining the operation command identifier based on the interaction instruction, and determining the operation command based on the operation command identifier. In response to determining that the interaction instruction includes the operation command, the operation command is directly determined from the interaction instruction.

Upon receipt of the recognition result from the server, in order to determine an operation that the user needs to perform, the terminal parses the recognition result to acquire the operation command and the operation object. The operation command corresponds an action that needs to be executed, and the operation object is a target for which the action needs to be performed. As such, the terminal may determine the operation that the user needs to perform.

Next, the terminal may perform the action corresponding to the operation command on the operation object. For example, if the operation command is "play a song" and the operation object is "a song A", the terminal may perform the operation of playing the song A.

Figure 4:
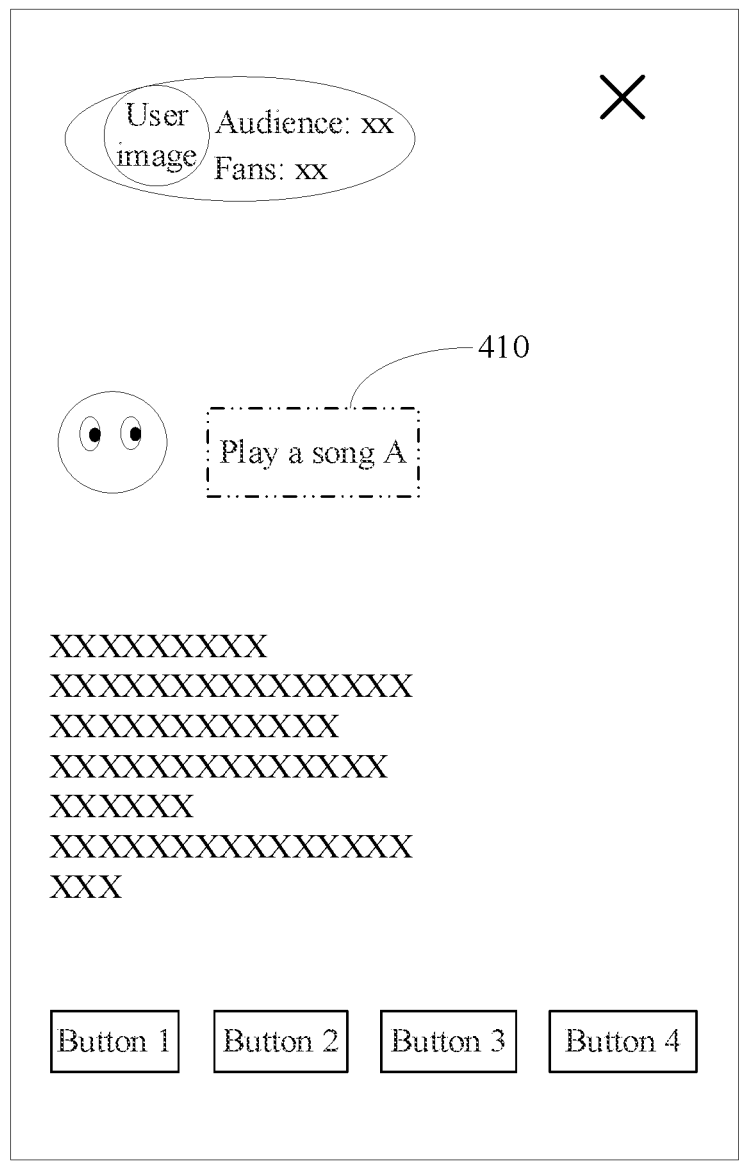
FIG. 4 is another diagram of the interaction interface of the live streaming room according to an example embodiment.

In one embodiment, upon determining the above operation command and the operation object, the terminal may display prompt information corresponding to both the operation command and the operation object on the interaction interface of the live streaming room for facilitating viewing by the user. Thus, the user may determine whether the operation to be performed by the terminal is an operation which he or she desires, and if the operation is not the operation he or she desires, the user may resend a voice signal to implement a required operation. For example, as shown in FIG. 4 which is a diagram of an interaction interface of a live streaming room, when the terminal determines that the operation command is "playing a song" and the operation object is "a song A", the terminal displays the prompt information 410 "play the song A" on the interface for viewing by the user.

It can be seen that in this embodiment, the terminal parses the recognition result from the server to acquire the operation command and the operation object and then performs the action corresponding to the operation command on the operation object. As such, the recognition result can be parsed accurately and accurate response to the user's interaction instruction can be achieved.

In some embodiments, the above recognition result includes an operation command identifier and an operation object. In such a case, parsing the recognition result to acquire the operation command and the operation object includes: parsing the recognition result to acquire the operation command identifier and the operation object, and determining, according to a preset corresponding relationship between the operation command identifier and the operation command, the operation command corresponding to the operation command identifier.

In order to determine the operation command, the terminal presets the corresponding relationship between the operation command identifier and the operation command. The operation commands included in the corresponding relationship are operation commands corresponding to various functions respectively in the virtual space. That is, the various functions in the live streaming room are fixed generally, including a photographing function, a microphone-connecting function, a gift-giving function, a song-playing function, and the like. Therefore, for ease of the determination of the operation command, the operation command identifiers corresponding to these functions are preset.

After parsing the recognition result to acquire the operation command identifier and the operation object, the terminal determines, according to the corresponding relationship, the operation command corresponding to the operation command identifier acquired by parsing. For example, the preset corresponding relationship between the operation command identifier and the operation command is as shown in the following table:

| Serial number | Operation command identifier | Operation command |
| --- | --- | --- |
| 1 | A# | play a song |
| 2 | B# | open |
| 3 | C# | stop playing |

Thus, if the operation command identifier acquired by the terminal is C# after the terminal parses the above recognition result, it is determined that the operation command is stop playing.

It can be seen that in this embodiment, the above recognition result includes the operation command identifier. In this case, the terminal may parse the recognition result to acquire the operation command identifier and the operation object, and then determine, according to the preset corresponding relationship between the operation command identifier and the operation command, the operation command corresponding to the operation command identifier acquired by parsing. Thus, the operation command can be determined more quickly and the response speed is increased further, thereby improving the user experience.

Corresponding to the above method for processing the voice signal, an embodiment of the present disclosure further provides another method for processing a voice signal. This method according to the embodiment of the present disclosure may be applicable to a server of the above live streaming application. This method for processing the voice signal is described hereinafter according to the embodiment of the present disclosure.

Figure 5:
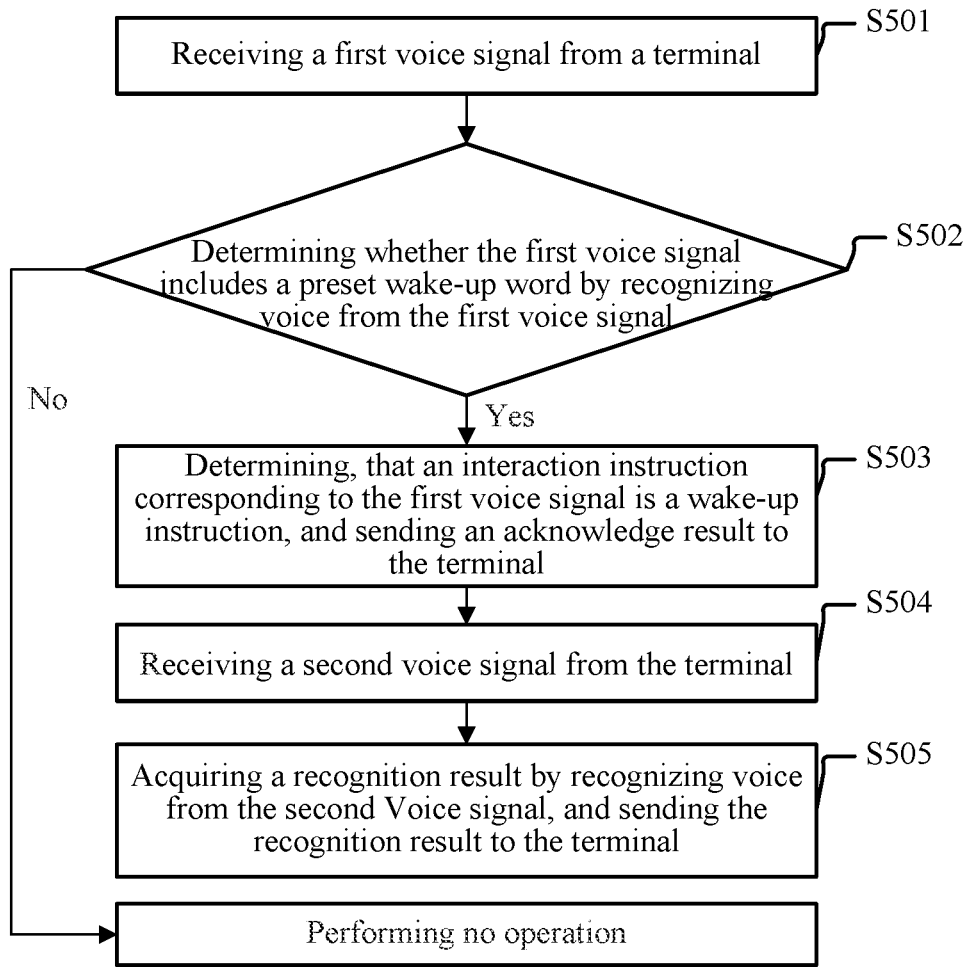
FIG. 5 is a flowchart of another method for processing a voice signal according to an example embodiment.

As shown in FIG. 5, a method for processing a voice signal, applicable to a server, includes the following steps.

In step S501, the server receives a first voice signal from a terminal.

In step S502, the server performs voice recognition on the first voice signal to determine whether the first voice signal includes a preset wake-up word; if the first voice signal includes the preset wake-up word, step S503 is performed; and otherwise, no operation is performed.

In one embodiment, the server performs no operation in response to determining that the first voice signal does not include the preset wake-up word; or the server sends a non-acknowledge result to the terminal in response to determining that an interaction instruction corresponding to the first voice signal is not a wake-up instruction.

In step S503, the server determines that the interaction instruction corresponding to the first voice signal is the wake-up instruction, and then sends an acknowledge result to the terminal.

In one embodiment, the server generates the acknowledge result in response to determining that the first voice signal includes the preset wake-up word, and then sends the acknowledge result to the terminal, wherein the acknowledge result is intended to indicate that the server determines that the interaction instruction corresponding to the first voice signal is the wake-up instruction.

In step S504, the server receives a second voice signal from the terminal.

In step S505, the server acquires a recognition result by recognizing voice from the second voice signal, and sends the recognition result to the terminal.

In one embodiment, acquiring a recognition result by recognizing voice from the second voice signal includes: determining the recognition result based on the second voice signal.

It can be seen that in the solution according to the embodiment of the present disclosure, the server receives the first voice signal from the terminal, and determines whether the first voice signal includes the preset wake-up word by recognizing voice from the second voice signal; and if the first voice signal includes the preset wake-up word, the server determines that the interaction instruction corresponding to the first voice signal is the wake-up instruction, and then sends the acknowledge result to the terminal, receives the second voice signal from the terminal, acquires the recognition result by recognizing voice from the second voice signal, and sends the recognition result to the terminal. Since in the virtual space, a user operates the terminal by sending a voice signal, that is, the user can trigger the terminal to operate in the virtual space without manually operating the terminal frequently, the convenience of operating the terminal in the webcasting process is greatly improved. Moreover, since the terminal may send the first voice signal to the server upon determining that the interaction instruction corresponding to the first voice signal is the wake-up instruction, and continue to receive the voice signal in the virtual space upon receipt of the acknowledgement result from the server, the wake-up instruction may be accurately recognized even in a noisy live streaming environment by double acknowledgements by the terminal and the server, thereby increasing the recognition accuracy rate of the wake-up instruction.

When live streaming or watching a live stream with a live streaming application mounted on the terminal, the user can send various voice signals and the terminal acquires the voice signal in the virtual space as the first voice signal. Upon acquiring the first voice signal in the virtual space, the terminal determines whether the interaction instruction corresponding to the first voice signal is the wake-up instruction.

The terminal determines semantic information of the first voice signal by recognizing voice from the first voice signal. If the semantic information includes the preset wake-up word, the terminal determines that the interaction instruction corresponding to the first voice signal is the wake-up instruction. For a live streaming scenario, the environment is noisy and the recognition of the voice signal may not be accurate. Therefore, in order to accurately determine whether the interaction instruction corresponding to the first voice signal is the wake-up instruction, the terminal sends the first voice signal to the server.

In step S501, the server receives the first voice signal from the terminal. Upon receipt of the first voice signal, the server determines whether the first voice signal includes the preset wake-up word; if the first voice signal includes the preset wake-up word, the server determines that the interaction instruction corresponding to the first voice signal is the wake-up instruction. At this time, the server sends the acknowledge result to the terminal.

Upon receipt of the acknowledgement result from the server, the terminal continues to receive a voice signal in the virtual space, and sends the voice signal as the second voice signal to the server. Further, the server receives the second voice signal from the terminal in step S504, acquires the recognition result by recognizing voice from the second voice signal, sends the recognition result to the terminal in step S505. In one embodiment, the server encodes the recognition result with a protobuf encoding method, and then sends the encoded recognition result to the terminal.

Upon receipt of the recognition result from the server, the terminal parses the recognition result to acquire an interaction instruction corresponding to the second voice signal, and then responds to the interaction instruction so as to complete an operation that the user wants to perform.

Figure 6:
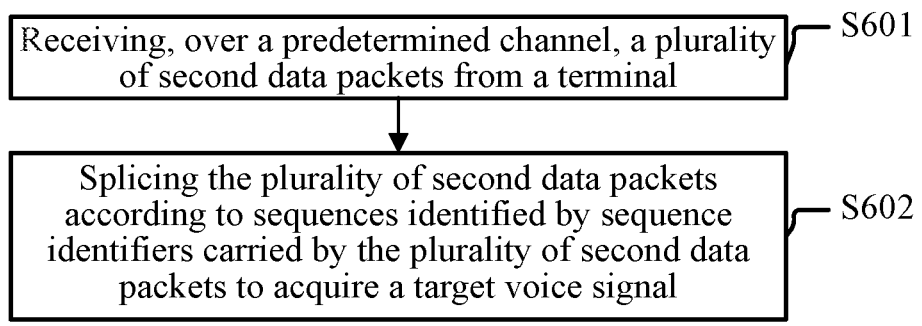
FIG. 6 is a flowchart of receiving a target voice signal according to an example embodiment.

In some embodiments, as shown in FIG. 6, receiving the target voice signal from the terminal includes the following steps.

In S601, the server receives, over a predetermined channel, a plurality of second data packets from the terminal.

The target voice signal is the first voice signal or the second voice signal. That is, the server receives any voice signal from the terminal in this way. In response to determining the target voice signal as the first voice signal, step S601 includes: receiving the plurality of second data packets from the terminal, wherein each of the plurality of second data packets carries a sequence identifier and the plurality of second data packets are data packets of the first voice signal.

The server receives, over the predetermined channel, the plurality of second data packets from the terminal. When sending the target voice signal to the server, the terminal generates the plurality of first data packets by encapsulating the target voice signal based on a preset duration, then generates the plurality of second data packets by adding the sequence identifiers to the plurality of first data packets respectively, and further sends the plurality of second data packets to the server over the predetermined channel. As such, the plurality of second data packets received by the server carry the sequence identifiers.

In one embodiment, the above predetermined channel is a dedicated socket channel provided by a socket audio service (SAS). As such, the data transmission between the terminal and the server is faster and more stable.

In S602, the server splices the plurality of second data packets according to sequences identified by the sequence identifiers carried by the plurality of second data packets to acquire the target voice signal.

Further, the server may acquire the target voice signal by splicing the plurality of second data packets according to sequences identified by the sequence identifiers carried by the plurality of second data packets. In response to determining the target voice signal as the first voice signal, the server splices the plurality of second data packets according to sequences identified by the sequence identifiers carried by the plurality of second data packets to acquire the first voice signal. For example, if the server receives 10 data packets and the sequence identifiers carried by these 10 data packets are 1 to 10 respectively, the server splices the corresponding second data packets in the order of the sequence identifiers from 1 to 10, and then restores the target voice signal.

It can be seen that in this embodiment, the server receives, over the predetermined channel, the plurality of second data packets from the terminal, and splices the plurality of second data packets according to sequences identified by the sequence identifiers carried by the plurality of second data packets to acquire the target voice signal. As such, the target voice signal may be acquired by accurate splicing. In addition, the terminal encapsulates the target voice signal into the plurality of second data packets and may successively send the plurality of second data packets to the server, rather than waiting for the end of the target voice signal and then sending all the plurality of second data packets to the server. In this way, the server starts to process the target voice signal once receiving the second data packets, which may shorten the user's waiting time, ensure faster and more stable data transmission between the terminal and the server, thus improve the user experience.

In some embodiments, acquiring the recognition result by recognizing voice from the second voice signal includes: determining the recognition result based on the second voice signal.

The server determines semantic information of the second voice signal by recognizing voice from the second voice signal, determines an operation command and an operation object which correspond to the second voice signal according to the semantic information, and determines the recognition result according to the operation command and the operation object. The operation command corresponds to each function in a live streaming room.

In one embodiment, determining the recognition result according to the operation command and the operation object includes: combining the operation command and the operation object into the recognition result.

As the semantic information may identify the content of an operation that the user wants to perform, the server performs voice recognition on the second voice signal to determine the semantic information of the second voice signal, then determines the operation command and the operation object which correspond to the second voice signal according to the semantic information, and determines an operation on the operation command and the operation object as the recognition result. The operation command corresponds to an action that needs to be conducted, and the operation object is a target for which the action needs to be performed. For example, if the semantic information of the second voice signal is sending a smiling-face expression, the operation command may be send; and the operation object may be the smiling-face expression.

It can be seen that in this embodiment, the server performs voice recognition on the second voice signal to determine the semantic information of the second voice signal, then determines the operation command and the operation object which correspond to the second voice signal according to the semantic information, and combines the operation command and the operation object into the recognition result. As such, the recognition result can be determined accurately and thus the terminal can accurately respond to the user's interaction instruction.

In some embodiments, determining the recognition result according to the operation command and the operation object includes:

determining an operation command identifier corresponding to the operation command, and combining the operation command identifier and the operation object into the recognition result.

Determining the operation command identifier corresponding to the operation command includes: determining, according to a preset corresponding relationship between the operation command identifier and the operation command, the operation command identifier corresponding to the operation command, and combining the operation command identifier and the operation object into the recognition result.

In order to determine the operation command, the server presets the corresponding relationship between the operation command identifier and the operation command. The operation commands included in the corresponding relationship are operation commands corresponding to various functions in the virtual space. That is, the various functions in the live streaming room are fixed generally, including a photographing function, a microphone-connecting function, a gift-giving function, a song-playing function, and the like. Therefore, for ease of the determination of the operation command, the server presets the operation command identifiers corresponding to these functions.

As such, upon determining, according to the semantic information of the second voice signal, the operation command and the operation object which correspond to the second voice signal, the server may determine, according to the preset corresponding relationship between the operation command identifier and the operation command, the operation command identifier corresponding to the determined operation command, then combine the operation command identifier and the operation object into the recognition result, and send the recognition result to the terminal.

It can be seen that in this embodiment, the server determines, according to the semantic information, the operation command and the operation object which correspond to the second voice signal, then determines, according to the preset corresponding relationship between the operation command identifier and the operation command, the operation command identifier corresponding to the determined operation command, and combines the operation command identifier and the operation object into the recognition result. As such, the terminal may more quickly determine the operation command, thereby further increasing the response speed and improving the user experience.

Figure 7:
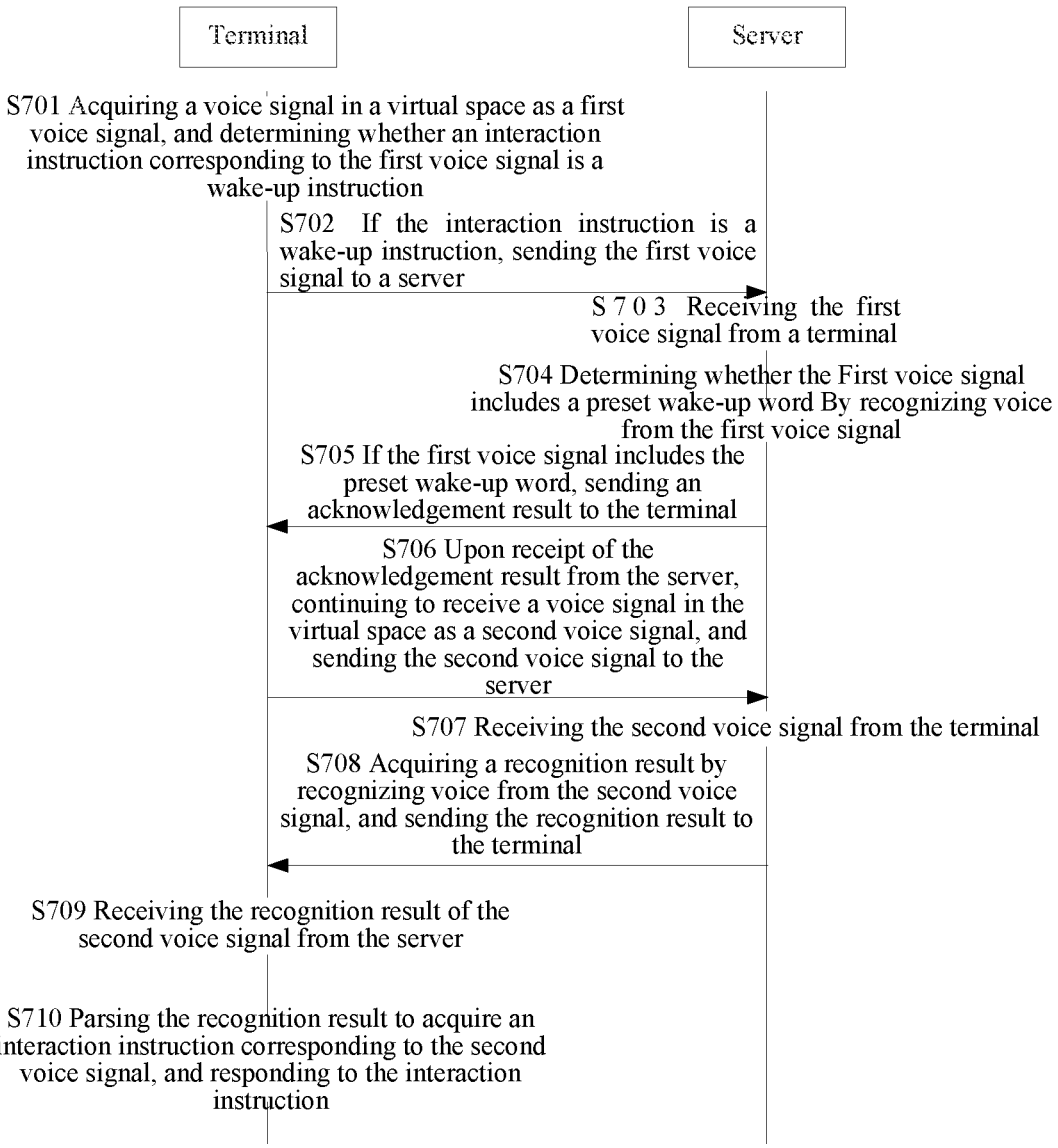
FIG. 7 is a signaling interaction flowchart of the method for processing the voice signal according to one example embodiment.

For further description of the method for processing the voice signal according to the embodiment of the present disclosure, the method for processing the voice signal according to the embodiment of the present disclosure is described hereinafter with reference to FIG. 7. As shown in FIG. 7, the method for processing the voice signal includes the following steps.

In step S701, a terminal acquires a voice signal in a virtual space as a first voice signal, and determines whether an interaction instruction corresponding to the first voice signal is a wake-up instruction, and if the interaction instruction is a wake-up instruction, step S702 is performed.

The virtual space is configured for a real-time video behavior.

In step S702, the terminal sends the first voice signal to a server.

In step S703, the server receives the first voice signal from the terminal.

In step S704, the server determines, by recognizing voice from the first voice signal, whether the first voice includes a preset wake-up word; and if the first voice signal includes the preset wake-up word, step S705 is performed.

In step S705, the server determines that the interaction instruction corresponding to the first voice signal is the wake-up instruction, and then sends an acknowledge result to the terminal.

The server generates the acknowledge result in response to determining that the first voice signal includes the preset wake-up word and then sends the acknowledge result to the terminal, wherein the acknowledge result is intended to indicate that the server determines that the interaction instruction corresponding to the first voice signal is the wake-up instruction.

In step S706, the terminal continues to receive a voice signal in the virtual space as a second voice signal upon receipt of the acknowledgement result from the server, and sends the second voice signal to the server.

The acknowledgement result is intended to indicate that the server determines that the interaction instruction corresponding to the first voice signal is the wake-up instruction.

In step S707, the server receives the second voice signal from the terminal.

In step S708, the server acquires a recognition result by recognizing voice from the second voice signal, and sends the recognition result to the terminal.

In step S709, the terminal receives the recognition result of the second voice signal from the server.

In step S710, the terminal parses the recognition result to acquire an interaction instruction corresponding to the second voice signal, and responds to the interaction instruction.

It can be seen that in this embodiment, the terminal acquires the voice signal in the virtual space as the first voice signal, and determines whether the interaction instruction corresponding to the first voice signal is the wake-up instruction.

If determining that the interaction instruction corresponding to the first voice signal is the wake-up instruction, the terminal sends the first voice signal to the server; and the server receives the first voice signal from the terminal, and performs voice recognition on the first voice signal to determine whether the first voice signal includes the preset wake-up word.

If the first voice signal includes the preset wake-up word, the server determines that the interaction instruction corresponding to the first voice signal is the wake-up instruction, and then sends the acknowledge result to the terminal. The terminal continues to receive the voice signal in the virtual space as the second voice signal upon receipt of the acknowledgement result from the server, sends the second voice signal to the server. The server receives the second voice signal from the terminal, acquires the recognition result by recognizing voice from the second voice signal, and sends the recognition result to the terminal. The terminal receives the recognition result of the second voice signal from the server, then parses the recognition result to acquire the interaction instruction corresponding to the second voice signal, and responds to the interaction instruction.

As in the virtual space, the user can operate the terminal by sending the voice signal without manually operating the terminal frequently, the convenience of operating the terminal in the webcasting process is greatly improved. Moreover, since the terminal may send the first voice signal to the server upon determining that the interaction instruction corresponding to the first voice signal is the wake-up instruction, and continue to receive the voice signal in the virtual space upon receipt of the acknowledgement result from the server, the wake-up instruction may be recognized accurately even in a noisy live streaming environment by double acknowledgements by the terminal and the server, thereby increasing the recognition accuracy rate of the wake-up instruction.

Figure 8:
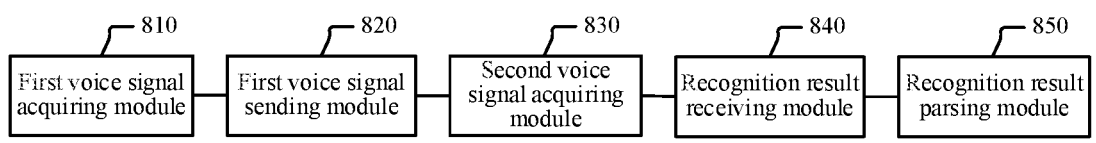
FIG. 8 is a structural block diagram of a system for processing a voice signal according to an example embodiment.

FIG. 8 is a block diagram of a system for processing a voice signal to an example embodiment.

As shown in FIG. 8, the system for processing the voice signal, applicable to a terminal includes a processor configured to implement functions of a first voice signal acquiring module 810, a first voice signal sending module 820, a second voice signal acquiring module 830, a recognition result receiving module 840, and a recognition result parsing module 850.

The first voice signal acquiring module 810 is configured to acquire a voice signal in a virtual space as a first voice signal, and determine whether an interaction instruction corresponding to the first voice signal is a wake-up instruction.

The virtual space is configured for a real-time video behavior, i.e., a live streaming behavior. In one embodiment, the virtual space is a live streaming room. In one embodiment, the first voice signal acquiring module 810 is configured to receive a first voice signal when an interaction interface of the live streaming room is in a display state.

The first voice signal sending module 820 is configured to send the first voice signal to a server by a sending module (not shown in FIG. 8) if the interaction instruction corresponding to the first voice signal is the wake-up instruction.

The second voice signal acquiring module 830 is configured to continue to receive a voice signal in the virtual space as a second voice signal upon receipt of an acknowledgement result from the server, and send the second voice signal to the server by the sending module.

The acknowledgement result is intended to indicate that the server determines that the interaction instruction corresponding to the first voice signal is the wake-up instruction.

The recognition result receiving module 840 is configured to receive a recognition result of the second voice signal from the server.

The recognition result parsing module 850 is configured to parse the recognition result to acquire an interaction instruction corresponding to the second voice signal, and respond to the interaction instruction.

In one embodiment, parsing the recognition result to acquire the interaction instruction corresponding to the second voice signal means that the interaction instruction is determined based on the recognition result. The virtual space is the live streaming room and thus responding to the interaction instruction means responding to the interaction instruction in the live streaming room. In one embodiment, the second voice signal acquiring module 830, the recognition result receiving module 840, and the recognition result parsing module 850 are configured to receive the second voice signal in response to receiving the acknowledgement result from the server, and respond to the interaction instruction corresponding to the second voice signal in the live streaming room.

In the above embodiment, the description is given with an example that the server performs voice recognition on the second voice signal. The terminal may also locally perform voice recognition on the second voice signal. In one embodiment, the recognition result receiving module 840 is further configured to perform voice recognition on the second voice signal to acquire the interaction instruction corresponding to the second voice signal.

The recognition result parsing module 850 is configured to respond to the interaction instruction in the live streaming room.

It can be seen that in the solution according to the embodiment of the present disclosure, the terminal acquires the voice signal in the virtual space as the first voice signal, and determines whether the interaction instruction corresponding to the first voice signal is the wake-up instruction.

If determining that the interaction instruction corresponding to the first voice signal is the wake-up instruction, the terminal sends the first voice signal to the server; the terminal continues to receive the voice signal in the virtual space as the second voice signal upon receipt of the acknowledgement result from the server, and sends the second voice signal to the server, wherein the acknowledgement result is intended to indicate that the server determines that the interaction instruction corresponding to the first voice signal is the wake-up instruction; the terminal receives the recognition result of the second voice signal from the server; and the terminal parses the recognition result to acquire the interaction instruction corresponding to the second voice signal, and responds to the interaction instruction.

As in the virtual space, a user can operate the terminal by sending the voice signal without manually operating the terminal frequently, the convenience of operating the terminal in the webcasting process is greatly improved. Moreover, since the terminal may send the first voice signal to the server upon determining that the interaction instruction corresponding to the first voice signal is the wake-up instruction, and continues to receive the voice signal in the virtual space upon receipt of the acknowledgement result from the server, the wake-up instruction may be accurately recognized even in a noisy live streaming environment by double acknowledgements by the terminal and the server, thereby increasing the recognition accuracy rate of the wake-up instruction.

In some embodiments, the sending module includes:

a data packet encapsulating unit (not shown in FIG. 8), configured to generate a plurality of first data packets by encapsulating a target voice signal based on a preset duration, wherein the target voice signal is the first voice signal or the second voice signal;

a sequence identifier adding unit (not shown in FIG. 8), configured to generate a plurality of second data packets by adding a sequence identifier to each of the plurality of data packets; and a data packet sending unit (not shown in FIG. 8), configured to send the plurality of second data packets to the server over a predetermined channel.

In one embodiment, the predetermined channel is any channel and the data packet sending unit is configured to send the plurality of second data packets to the server.

In some embodiments, the second voice signal acquiring module 830 includes:

a prompt information output unit (not shown in FIG. 8), configured to output wake-up success prompt information upon receipt of the acknowledgement result from the server; and a second voice signal acquiring unit (not shown in FIG. 8), configured to acquire a voice signal input by the user in the virtual space based on the wake-up success prompt information, and determine the second voice signal based on the voice signal input by the user.

In some embodiment, if the recognition result includes an operation command and an operation object, the recognition result parsing module 850 includes: a recognition result parsing unit (not shown in FIG. 8), configured to parse the recognition result to acquire the operation command and the operation object.

If the interaction instruction is determined based on the recognition result, the recognition result parsing unit is configured to determine the operation command and the operation object based on the interaction instruction, and control the operation object in the live streaming room according to the operation command. The operation command corresponds to each function in the live streaming room.

When the interaction instruction includes an operation command and an operation object, an action executing unit (not shown in FIG. 8) is configured to perform an action corresponding to the operation command on the operation object.

In some embodiment, the recognition result includes an operation command identifier and an operation object.

The recognition result parsing unit includes:

a recognition result parsing sub-unit (not shown in FIG. 8), configured to parse the recognition result to acquire the operation command identifier and the operation object, wherein when the interaction instruction is determined based on the recognition result, the recognition result parsing sub-unit is configured to determine the operation command identifier based on the interaction instruction, and determine the operation command based on the operation command identifier; and an operation command determining sub-unit (not shown in FIG. 8), configured to determine, according to a preset corresponding relationship between the operation command identifier and the operation command, the operation command corresponding to the operation command identifier acquired by parsing.

The operation commands included in the corresponding relationship are operation commands corresponding to various functions in the virtual space.

Figure 9:
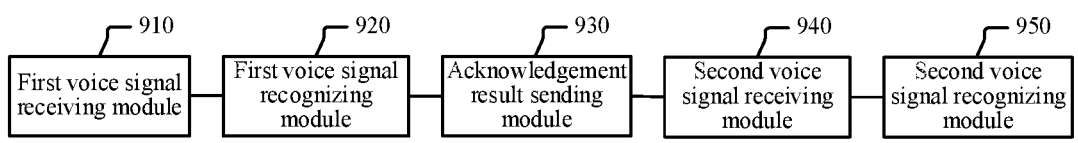
FIG. 9 is a structural block diagram of another system for processing a voice signal according to an example embodiment.

FIG. 9 is a block diagram of another system for processing a voice signal according to one example embodiment.

As shown in FIG. 9, the system for processing the voice signal, applicable to a server, includes a processor configured to implement functions of a first voice signal receiving module 910, a first voice signal recognizing module 920, an acknowledgement result sending module 930, a second voice signal receiving module 940, and a second voice signal recognizing module 950.

The first voice signal receiving module 910 is configured to receive a first voice signal from a terminal.

The first voice signal recognizing module 920 is configured to determine, by recognizing voice from the first voice signal, whether the first voice signal includes a preset wake-up word.

The acknowledgement result sending module 930 is configured to determine that an interaction instruction corresponding to the first voice signal is a wake-up instruction if the first voice signal includes the preset wake-up word, generate an acknowledge result, and send the acknowledge result to the terminal.

The acknowledgement result is intended to indicate that the server determines that the interaction instruction corresponding to the first voice signal is the wake-up instruction.

The second voice signal receiving module 940 is configured to receive a second voice signal from the terminal.

The second voice signal recognizing module 950 is configured to acquire a recognition result by recognizing voice from the second voice signal, and send the recognition result to the terminal.

It can be seen that in the solution according to the embodiment of the present disclosure, the server receives the first voice signal from the terminal, and performs voice recognition on the first voice signal to determine whether the first voice signal includes the preset wake-up word.

If the first voice signal includes the present wake-up word, the server determines that the interaction instruction corresponding to the first voice signal is the wake-up instruction, sends the acknowledge result to the terminal, receives the second voice signal from the terminal, acquires the recognition result by recognizing voice from the second voice signal, and sends the recognition result to the terminal.

Since in the virtual space, a user can operate the terminal by sending the voice signal, that is, the user can trigger the terminal to operate in the virtual space without manually operating the terminal frequently, the convenience of operating the terminal in the webcasting process is greatly improved. Moreover, since the terminal may send the first voice signal to the server upon determining that the interaction instruction corresponding to the first voice signal is the wake-up instruction, and continues to receive the voice signal in the virtual space upon receipt of the acknowledgement result from the server, the wake-up instruction may be accurately recognized even in a noisy live streaming environment by double acknowledgements by the terminal and the server, thereby increasing the recognition accuracy rate of the wake-up instruction.

In some embodiments, the first voice signal receiving module 910 and the second voice signal receiving module 940 include:

a data packet receiving unit (not shown in FIG. 9), configured to receive, over a predetermined channel, a plurality of second data packets from the terminal, wherein each of the plurality of second data packets carries a sequence identifier; and a data packet splicing unit (not shown in FIG. 9), configured to splice the plurality of second data packets according to sequences identified by the sequence identifiers carried by the plurality of second data packets to acquire a target voice signal, wherein the target voice signal is the first voice signal or the second voice signal.

In some embodiments, the second voice signal recognizing module 950 includes:

a semantic information determining unit (not shown in FIG. 9), configured to determine semantic voice of the second voice signal by recognizing voice from the second voice signal; and a recognition result determining unit (not shown in FIG. 9), configured to determine, according to the semantic information, an operation command and an operation object which correspond to the second voice signal, and determine the recognition result based on the operation command and the operation object.

In some embodiments, the recognition result determining unit includes:

a first recognizing sub-unit (not shown in FIG. 9), configured to determine, according to the semantic information, an operation command and an operation object which correspond to the second voice signal; and a second recognizing sub-unit (not shown in FIG. 9), configured to determine, according to a preset corresponding relationship between the operation command identifier and the operation command, an operation command identifier corresponding to the determined operation command, and determine the recognition result based on the operation command identifier and the operation object.

The operation commands included in the corresponding relationship are operation commands corresponding to various functions in the virtual space of the terminal and the virtual space is configured for a real-time video behavior.

In one embodiment, the second recognizing sub-unit is further configured to directly combine the operation command and the operation object into the recognition result.

Figure 10:
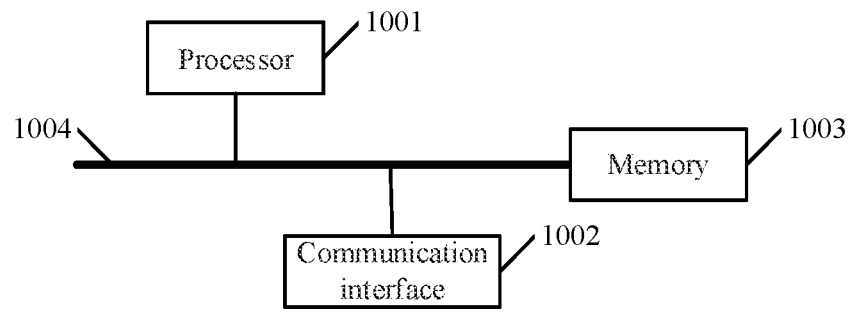
FIG. 10 is a structural block diagram of a terminal according to an example embodiment.

An embodiment of the present disclosure further provides a terminal. As shown in FIG. 10, the terminal includes a processor 1001, a communication interface 1002, a memory 1003, and a communication bus 1004. The processor 1001, the communication interface 1002, and the memory 1003 communicate with one another by the communication bus 1004.

The memory 1003 is configured to store a computer program.

The processor 1001, when running the computer program, is enabled to perform the following operations:

receiving a first voice signal when an interaction interface of a live streaming room is in a display state;

sending the first voice signal to a server in response to determining that the first voice signal includes a preset wake-up word; and receiving a second voice signal in response to receiving an acknowledgement result from the server, wherein the acknowledgement result is intended to instruct a server to determine that the first voice signal includes the preset wake-up word;

responding to an interaction instruction corresponding to the second voice signal in the live streaming room.

In some embodiments, the processor 1001, when running the computer program, is enabled to perform the following operations:

determining an interaction instruction based on the second voice signal; and responding to the interaction instruction in the live streaming room.

In some embodiments, the processor 1001, when running the computer program, is enabled to perform the following operations:

sending the second voice signal to the server;

receiving a recognition result of the second voice signal from the server; and determining the interaction instruction based on the recognition result.

In some embodiments, the processor 1001, when running the computer program, is enabled to perform the following operations:

determining an operation command and an operation object based on the interaction instruction, wherein the operation command corresponds to each function in the live streaming room; and controlling the operation object in the live streaming room based on the operation command.

In some embodiments, the processor 1001, when running the computer program, is enabled to perform the following operations:

determining an operation command identifier based on the interaction instruction; and determining the operation command based on the operation command identifier.

In some embodiments, the processor 1001, when running the computer program, is enabled to perform the following operations:

generating a plurality of first data packets by encapsulating the first voice signal based on a preset duration;

generating a plurality of second data packets by adding a sequence identifier to each of the plurality of first data packets; and sending the plurality of data packets to the server.

In some embodiments, the processor 1001, when running the computer program, is enabled to perform the following operations:

outputting wake-up success prompt information; and acquiring a voice signal input by a user based on the wake-up success prompt information, and determine the second voice signal based on the voice signal input by the user.

It can be seen that in the solution according to the embodiment of the present disclosure, the terminal acquires the voice signal in the virtual space as the first voice signal, and determines whether the interaction instruction corresponding to the first voice signal is the wake-up instruction.

If determining that the interaction instruction corresponding to the first voice signal is the wake-up instruction, the terminal sends the first voice signal to the server; upon receipt of the acknowledgement result from the server, the terminal continues to receive the voice signal in the virtual space as the second voice signal, and sends the second voice signal to the server, wherein the acknowledgement result is intended to indicate that the server determines that the interaction instruction corresponding to the first voice signal is the wake-up instruction; the terminal receives the recognition result of the second voice signal from the server; and the terminal parses the recognition result to acquire the interaction instruction corresponding to the second voice signal, and responds to the interaction instruction.

As in the virtual space, a user can operate the terminal by sending the voice signal without manually operating the terminal frequently, the convenience of operating the terminal in the webcasting process is greatly improved. Moreover, since the terminal may send the first voice signal to the server upon determining that the interaction instruction corresponding to the first voice signal is the wake-up instruction, and continues to receive the voice signal in the virtual space upon receipt of the acknowledgement result from the server, the wake-up instruction may be accurately recognized even in a noisy live streaming environment by double acknowledgements by the terminal and the server, thereby increasing the recognition accuracy rate of the wake-up instruction.

The above communication bus 1004 of the terminal is a peripheral component interconnect (PCI) bus or an extended industry standard architecture (EISA) bus. The communication bus 1004 includes an address bus, a data bus, a control bus, and the like. For ease of illustration, the communication bus is denoted by a thick line only in the figure, but this does not mean that only one bus or one kind of bus exists.

The communication interface 1002 is configured for communication between the above terminal and other devices (server).

The memory 1003 includes a random access memory (RAM) and also includes a non-volatile memory (NVM), such as at least one disk memory. Optionally, the memory 1003 is at least one storage apparatus away from the above processor 1001.

The above processor 1001 is a general-purpose processor, including a central processing unit (CPU), a network processor (NP), and the like; or a digital signal processor (DSP), an application specific integrated circuit (ASIC), a field-programmable gate array (FPGA); or other programmable logic devices, discrete gate or transistor logic devices, or discrete hardware components.

Figure 11:
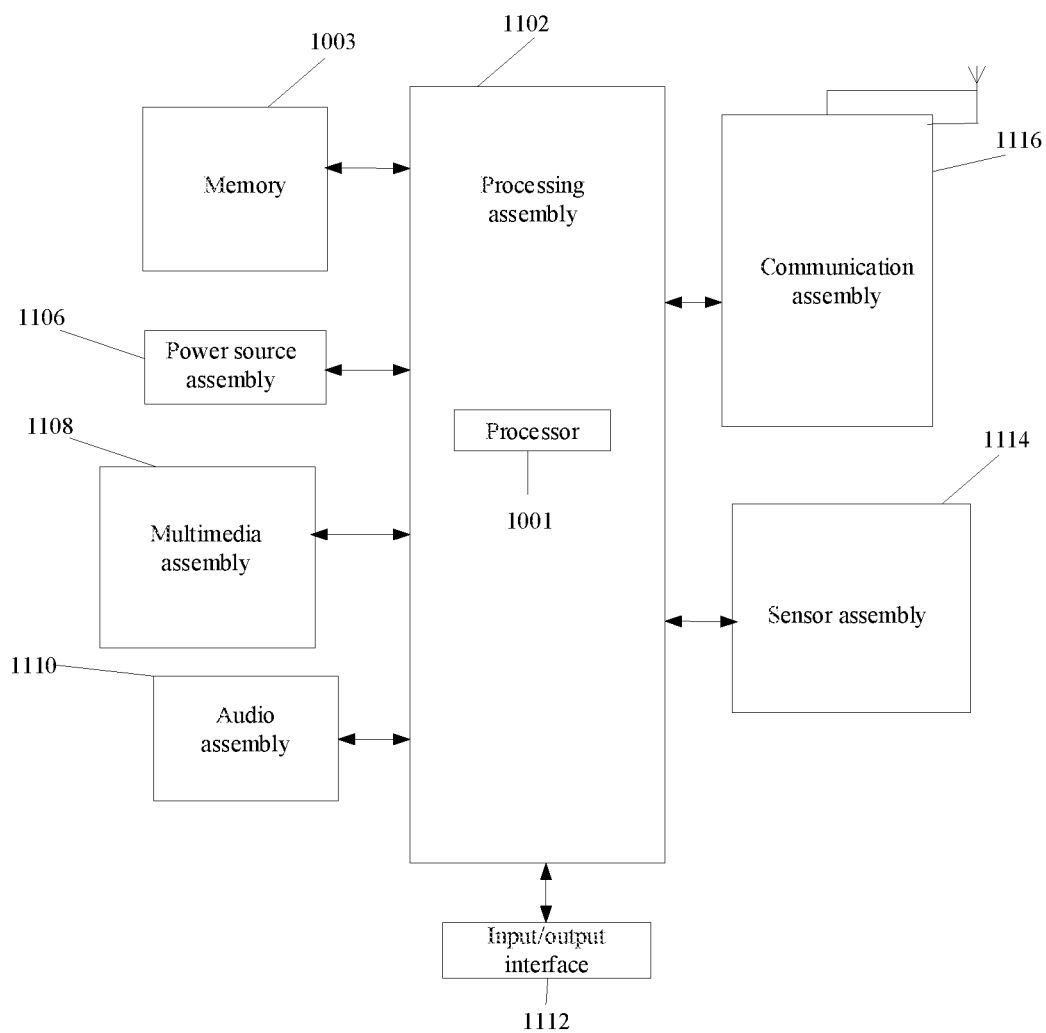
FIG. 11 is a structural block diagram of another terminal according to an example embodiment.

FIG. 11 is a structural block diagram of the above terminal according to one example embodiment. For example, the terminal is a mobile phone, a computer, a digital broadcast terminal, a message transceiving device, a game console, a tablet device, a medical device, a fitness device, a personal digital assistant, or the like.

With reference to FIG. 11, the terminal includes one or more of following assemblies: a processing assembly 1102, a memory 1003, a power source assembly 1106, a multimedia assembly 1108, an audio assembly 1110, an input/output (I/O) interface 1112, a sensor assembly 1114, and a communication assembly 1116.

The processing assembly 1102 usually controls the overall operation of the terminal, such as operations associated with display, telephone call, data communication, a camera operation, and a recording operation. The processing assembly 1102 includes one or more processors 1001 to execute instructions so as to complete all or part of the steps of the method for processing the voice signal. In addition, the processing assembly 1102 includes one or more modules to facilitate interaction between the processing assembly 1102 and other assemblies. For example, the processing assembly 1102 includes a multimedia module to facilitate interaction between the multimedia assembly 1108 and the processing assembly 1102.

The memory 1003 is configured to store various types of data to support operations at the terminal. The examples of these data include an instruction of any application or method operated on the terminal, contact person data, telephone book data, a message, a picture, a video, and the like. The memory 1003 is implemented by any type of a volatile storage device or a non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a disk or an optical disk.

The power source assembly 1106 provides power for various assemblies of the terminal. The power source assembly 1106 includes a power source management system, one or more power sources, and other components associated with generation, management, and distribution of power for the terminal.

The multimedia assembly 1108 includes a screen that provides an output interface and is located between the terminal and a user. In one embodiment, the screen includes a liquid crystal display (LCD) and a touch panel (TP). If the screen includes the touch panel, the screen is implemented as a touch screen so as to receive an input signal from the user. The touch panel includes one or more touch sensors to sense touch, sliding and a gesture on the touch panel. The touch sensor not only senses a boundary of a touch or sliding action, but also detects a duration and pressure related to the touch or sliding operation. In one embodiment, the multimedia assembly 1108 includes a front camera and/or a rear camera. When the terminal is in an operation mode, such as a shooting mode or a video mode, the front camera and/or the rear camera may receive external multimedia data. Each of the front camera and the rear camera is a fixed optical lens system or has a focal length and an optical zooming capacity.

The audio assembly 1110 is configured to output and/or input an audio signal. For example, the audio assembly 1110 includes a microphone (MIC). The microphone is configured to receive an external audio signal when the terminal is in the operation mode, such as a call mode, a recording mode, and a voice recognition mode. The received audio signal is further stored in the memory 1003, or sent via the communication assembly 1116. In one embodiment, the audio assembly 1110 further includes a loudspeaker for outputting the audio signal.

The I/O interface 1112 is an interface configured between the processing assembly 1102 and a peripheral interface module which is a keyboard, a click wheel, a button, or the like. These buttons include, but are not limited to: a home button, a volume button, a start button, and a locking button.

The sensor assembly 1114 includes one or more sensors for providing the terminal with state assessment of various aspects. For example, the sensor assembly 1114 detects an opening/closing state of the terminal, and relative positioning of the assembly, such as the display and a small keypad of the terminal. The sensor assembly 1114 may also detect a position change of the terminal or one assembly of the terminal, whether the user contacts the terminal, an orientation and/or acceleration/deceleration of the terminal and a temperature change of the terminal. The sensor assembly 1114 includes a proximity sensor configured to detect the presence of nearby objects without any physical contact. The sensor assembly 1114 further includes an optical sensor, such as a CMOS or CCD image sensor used in an imaging application. In one embodiment, the sensor assembly 1114 also includes an acceleration sensor, a gyroscope sensor, a magnetic sensor, a pressure sensor, or a temperature sensor.

The communication assembly 1116 is configured to facilitate wired or wireless communication between the terminal and other devices. The terminal may access a wireless network based on communication standards, such as Wi-Fi, operator networks (such as 2G, 3G, 4G, or 5G), or a combination thereof. In one example embodiment, the communication assembly 1116 receives a broadcast signal or broadcast-related information from an external broadcast management system via a broadcast channel. In one example embodiment, the communication assembly 1116 further includes a near-field communication (NFC) module to facilitate short-range communication. For example, the NFC module may be implemented based on a radio frequency identification (RFID) technology, an infrared data association (IrDA) technology, an ultra-wideband (UWB) technology, a Bluetooth (BT) technology and other technologies.

In example embodiments, the terminal is implemented by one or more ASICs, DSPs, digital signal processing devices (DSPDs), programmable logic devices (PLDs), FPGAs, controllers, micro-controllers, microprocessors, and other electronic elements to perform the method for processing the voice signal as described above.

In example embodiments, a non-transitory computer-readable storage medium including an instruction is further provided, such as a memory 1003 including at least one instruction. The at least one instruction may be executed by the processor 1001 of the terminal to perform the method for processing the voice signal as described above. For example, the non-temporary computer-readable storage medium is a ROM, a random access memory (RAM), a CD-ROM, a magnetic tape, a floppy disk, an optical data storage device or the like.

Figure 12:
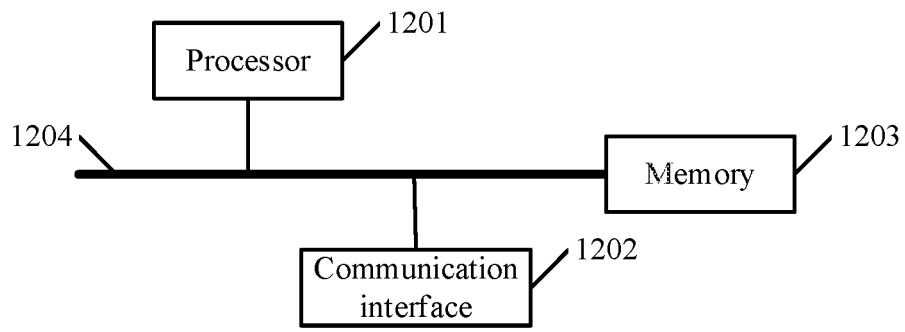
FIG. 12 is a structural block diagram of a server according to an example embodiment.

An embodiment of the present disclosure further provides a server. As shown in FIG. 12, the server includes a processor 1201, a communication interface 1202, a memory 1203, and a communication bus 1204. The processor 1201, the communication interface 1202, and the memory 1203 communicate with one another by the communication bus 1204.

The memory 1203 is configured to store a computer program.

The processor 1201, when running the computer program, is enabled to perform the following operations:

receiving a plurality of second data packets from a terminal, wherein each of the plurality of second data packets carries a sequence identifier;

splicing the plurality of second data packets according to sequences identified by the sequence identifiers carried by the plurality of second data packets to acquire a first voice signal; and generating an acknowledgement result in response to determining that the first voice signal includes a preset wake-up word, wherein the acknowledgement result is intended to indicate that the server determines that the first voice signal includes the preset wake-up word; and sending the acknowledgement result to the terminal.

In some embodiments, the processor 1201, when running the computer program, is enabled to perform the following operations:

receiving a second voice signal from the terminal; and determining a recognition result based on the second voice signal, and sending the recognition result to the terminal.

In some embodiments, the processor 1201, when running the computer program, is enabled to perform the following operations:

determining semantic information based on the second voice signal; and determining an operation command and an operation object based on the semantic information, and determining the recognition result based on the operation command and the operation object, wherein the operation command corresponds to each function in a live streaming room.

In some embodiments, the processor 1201, when running the computer program, is enabled to perform the following operation:

determining an operation command identifier corresponding to the operation command, and combining the operation command identifier and the operation object into the recognition result.

It can be seen that in the solution according to the embodiment of the present disclosure, the server receives the first voice signal from the terminal, and performs voice recognition on the first voice signal to determine whether the first voice signal includes the preset wake-up word.

If the first voice signal includes the preset wake-up word, the server determines that the interaction instruction corresponding to the first voice signal is the wake-up instruction, sends the acknowledge result to the terminal, receives the second voice signal from the terminal, acquires the recognition result by recognizing voice from the second voice signal, and sends the recognition result to the terminal.

As in the virtual space, a user can operate the terminal by sending the voice signal without manually operating the terminal frequently, the convenience of operating the terminal in the webcasting process is greatly improved. Moreover, since the terminal may send the first voice signal to the server upon determining that the interaction instruction corresponding to the first voice signal is the wake-up instruction, and continues to receive the voice signal in the virtual space upon receipt of the acknowledgement result from the server, the wake-up instruction may be accurately recognized even in a noisy live streaming environment by double acknowledgements by the terminal and the server, thereby increasing the recognition accuracy rate of the wake-up instruction.

The communication bus 1204 of the server is a PCI bus or an EISA bus. The communication bus includes an address bus, a data bus, a control bus, and the like. For ease of illustration, the communication bus is denoted by a thick line only in the figure, but this does not mean that only one bus or one kind of bus exists.

The communication interface 1202 is configured for communication between the above server and other devices (terminal).

The memory 1203 includes a RAM or includes an NVM, such as at least one disk memory. Optionally, the memory is at least one storage apparatus away from the above processor.

The above processor 1201 is a general-purpose processor, including a CPU, a NP, and the like; or a DSP, an ASIC, a FPGA or other programmable logic devices, discrete gate or transistor logic devices, or discrete hardware components.

Figure 13:
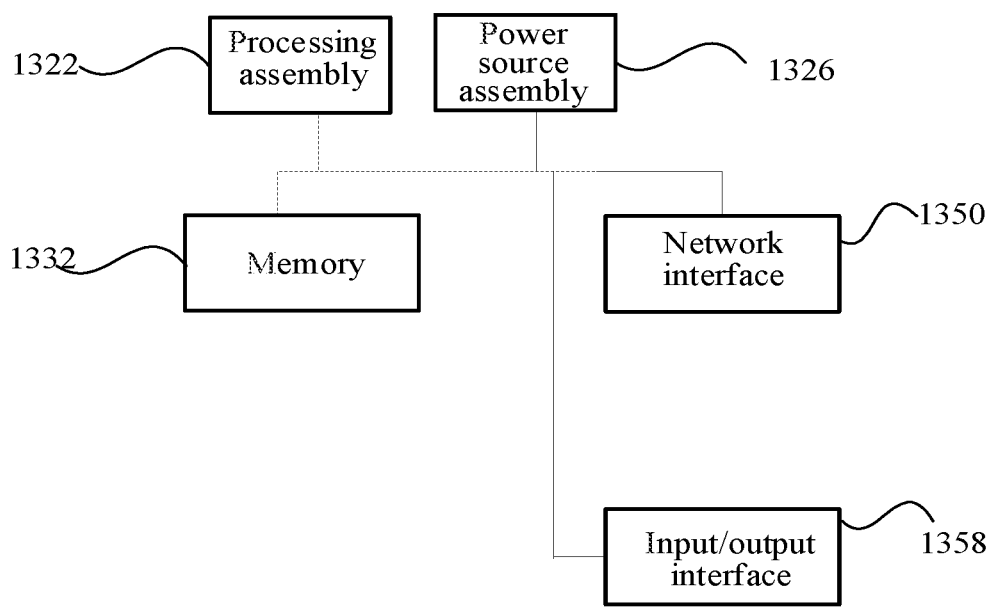
FIG. 13 is a structural block diagram of another server according to an example embodiment.

FIG. 13 is a structural block diagram of a server according to one example embodiment. The server includes a processing assembly 1322. The processing assembly 1322 further includes one or more processors 1201, and memory resources represented by the memory 1203 for storing at least one instruction executable by the processing assembly 1322, such as an application. The application stored in the memory 1203 includes one or more modules, each corresponding to a set of instructions. In addition, the processing assembly 1322, when executing the at least one instruction, is enabled to perform the method for processing the voice signal as described above.

The server further includes a power source assembly 1326 configured to manage a power source of the server; a wired or wireless network interface 1350 configured to connect the server to a network; and an I/O interface 1358. An operation of the server is based on an operating system stored in the memory 1332, such as Windows Server™, Mac OS X™, Unix™, Linux™, FreeBSD™ or the like.

An embodiment of the present disclosure further provides a computer-readable storage medium storing at least one instruction therein. The at least one instruction, when executed by a processor of a terminal, enables the terminal to perform the method for processing the voice signal according to any of the above embodiments.

It can be seen that in the solution according to the embodiment of the present disclosure, the terminal acquires the voice signal in the virtual space as the first voice signal, and determines whether the interaction instruction corresponding to the first voice signal is the wake-up instruction.

If determining that the interaction instruction corresponding to the first voice signal is the wake-up instruction, the terminal sends the first voice signal to the server; upon receipt of the acknowledgement result from the server, the terminal continues to receive the voice signal in the virtual space as the second voice signal, and sends the second voice signal to the server, wherein the acknowledgement result is intended to indicate that the server determines that the interaction instruction corresponding to the first voice signal is the wake-up instruction; the terminal receives the recognition result of the second voice signal from the server; and the terminal parses the recognition result to acquire the interaction instruction corresponding to the second voice signal, and responds to the interaction instruction.

As in the virtual space, a user can operate the terminal by sending the voice signal without manually operating the terminal frequently, the convenience of operating the terminal in the webcasting process is greatly improved. Moreover, since the terminal may send the first voice signal to the server upon determining that the interaction instruction corresponding to the first voice signal is the wake-up instruction, and continues to receive the voice signal in the virtual space upon receipt of the acknowledgement result from the server, the wake-up instruction may be accurately recognized even in a noisy live streaming environment by double acknowledgements by the terminal and the server, thereby increasing the recognition accuracy rate of the wake-up instruction.

An embodiment of the present disclosure further provides a computer-readable storage medium storing at least one instruction therein. The at least one instruction, when executed by a processor of a server, enables the server to perform the method for processing the voice signal according to any of the above embodiments.

It can be seen that in the solution according to the embodiment of the present disclosure, the server receives the first voice signal from the terminal, and performs voice recognition on the first voice signal to determine whether the first voice signal includes the preset wake-up word.

If the first voice signal includes the preset wake-up word, the server determines that the interaction instruction corresponding to the first voice signal is the wake-up instruction, sends the acknowledge result to the terminal, receives the second voice signal from the terminal, acquires the recognition result by recognizing voice from the second voice signal, and sends the recognition result to the terminal.

As in the virtual space, a user can operate the terminal by sending the voice signal without manually operating the terminal frequently, the convenience of operating the terminal in the webcasting process is greatly improved. Moreover, since the terminal may send the first voice signal to the server after determining that the interaction instruction corresponding to the first voice signal is the wake-up instruction, and continues to receive the voice signal in the virtual space upon receipt of the acknowledgement result from the server, the wake-up instruction may be recognized accurately even in a noisy live streaming environment by double acknowledgements by the terminal and the server, thereby increasing the recognition accuracy rate of the wake-up instruction.

An embodiment of the present disclosure further provides a computer program product. The computer program product, when running on a terminal, enables the terminal to perform the method for processing the voice signal according to any of the above embodiment.

It can be seen that in the solution according to the embodiment of the present disclosure, the computer program product, when running on the terminal, enables the terminal to acquire the voice signal in the virtual space as the first voice signal, and determine whether the interaction instruction corresponding to the first voice signal is the wake-up instruction; send the first voice signal to the server if the terminal determines that the interaction instruction corresponding to the first voice signal is the wake-up instruction; continue to receive the voice signal in the virtual space as the second voice signal upon receipt of the acknowledgement result from the server, and send the second voice signal to the server, wherein the acknowledgement result is intended to indicate that the server determines that the interaction instruction corresponding to the first voice signal is the wake-up instruction; receive the recognition result of the second voice signal from the server; and parse the recognition result to acquire the interaction instruction corresponding to the second voice signal, and respond to the interaction instruction.

As in the virtual space, a user can operate the terminal by sending the voice signal without manually operating the terminal frequently, the convenience of operating the terminal in the network broadcast process is greatly improved. Moreover, since the terminal may send the first voice signal to the server after determining that the interaction instruction corresponding to the first voice signal is the wake-up instruction, and continues to receive the voice signal in the virtual space upon receipt of the acknowledgement result from the server, the wake-up instruction may be accurately recognized even in a noisy live streaming environment by double acknowledgements by the terminal and the server, thereby increasing the recognition accuracy rate of the wake-up instruction.

An embodiment of the present disclosure further provides a computer program product. The computer program product, when running on a terminal, enables the terminal to perform the method for processing the voice signal according to any of the above embodiment.

It can be seen that in the solution according to the embodiment of the present disclosure, the computer program product, when running on the terminal, enables the terminal to receive the first voice signal from the terminal, and perform voice recognition on the first voice signal to determine whether the first voice signal includes the preset wake-up word.

If the first voice signal includes the preset wake-up word, the server determines that the interaction instruction corresponding to the first voice signal is the wake-up instruction, sends the acknowledge result to the terminal, receives the second voice signal from the terminal, acquires the recognition result by recognizing voice from the second voice signal, and sends the recognition result to the terminal.

Since in the virtual space, a user can operate the terminal by sending the voice signal, that is, the user can trigger the terminal to operate in the virtual space without manually operating the terminal frequently, the convenience of operating the terminal in the webcasting process is greatly improved. Moreover, since the terminal may send the first voice signal to the server upon determining that the interaction instruction corresponding to the first voice signal is the wake-up instruction, and continues to receive the voice signal in the virtual space upon receipt of the acknowledgement result from the server, the wake-up instruction may be accurately recognized even in a noisy live streaming environment by double acknowledgements by the terminal and the server, thereby increasing the recognition accuracy rate of the wake-up instruction.

Other embodiments of the present disclosure would be readily conceivable by those skilled in the art upon consideration of the description and practice of the present disclosure. The present disclosure is intended to cover any variations, uses, or adaptations of the present disclosure following general principles of the present disclosure and including the common general knowledge or conventional technical means in the art which is not disclosed in the present disclosure. The description and embodiments are to be considered as examples only, and a true scope and spirit of the present disclosure is indicated by the following claims.

It should be understood that the present disclosure is not limited to the precise constructions described above and shown in the accompanying drawings, and various modifications and changes may be made without departing from the scope thereof. The scope of the present disclosure is only be defined by the appended claims.

What is claimed is:

1. A method for processing a voice signal, applicable to a terminal on which a live streaming application is mounted, the method comprising:
    receiving a first voice signal when an interaction interface of a live streaming room is in a display state, wherein the live streaming room is configured for a real-time video behavior,
    sending the first voice signal to a server in response to determining that the first voice signal comprises a preset wake-up word;
    receiving a second voice signal in response to receiving an acknowledgement result from the server, wherein the acknowledgement result is intended to indicate that the server determines that the first voice signal comprises the preset wake-up word; and
    responding to an interaction instruction corresponding to the second voice signal in the live streaming room, to implement a function in the live streaming room that a user needs to execute, wherein the function is a function of the live streaming application and comprises a photographing function, a microphone-connecting function, a music-playing function, or a gift-giving function.

2. The method according to claim 1, wherein responding to the interaction instruction corresponding to the second voice signal in the live streaming room comprises:
    determining the interaction instruction based on the second voice signal; and
    responding to the interaction instruction in the live streaming room.

3. The method according to claim 2, wherein determining the interaction instruction based on the second voice signal comprises:
    sending the second voice signal to the server;
    receiving a recognition result of the second voice signal from the server; and
    determining the interaction instruction based on the recognition result.

4. The method according to claim 2, wherein responding to the interaction instruction in the live streaming room comprises:
    determining an operation command and an operation object based on the interaction instruction, wherein the operation command corresponds to the function in the live streaming room; and
    controlling the operation object in the live streaming room based on the operation command.

5. The method according to claim 4, wherein determining the operation command based on the interaction instruction comprises:
    determining an operation command identifier based on the interaction instruction; and
    determining the operation command based on the operation command identifier.

6. The method according to claim 1, wherein sending the first voice signal to the server comprises:
    generating a plurality of rust data packets by encapsulating the rust voice signal based on a preset duration;
    generating a plurality of second data packets by adding a sequence identifier to each of the plurality of first data packets; and
    sending the plurality of second data packets to the server.

7. The method according to claim 1, wherein receiving the second voice signal comprises:
    outputting wake-up success prompt information;
    acquiring a voice signal input by the user based on the wake-up success prompt information; and
    determining the second voice signal based on the voice signal input by the user.

8. A method for processing a voice signal, applicable to a server, the method comprising:
    receiving a plurality of second data packets from a terminal, wherein each of the plurality of second data packets carries a sequence identifier, wherein the terminal is mounted with a live streaming application;
    splicing the plurality of second data packets according to sequences identified by the sequence identifiers carried by the plurality of second data packets to acquire a first voice signal;
    generating an acknowledgement result in response to determining that the first voice signal comprises a preset wake-up word, wherein the acknowledgement result is intended to indicate that the server determines that the first voice signal comprises the preset wake-up word; and
    sending the acknowledgement result to the terminal, to cause the terminal to:
        respond to, after receiving the acknowledgment result, an interaction instruction corresponding to a received second voice signal in a live streaming room, to implement a function in the live streaming room that a user needs to execute, wherein the function is a function of the live streaming application and comprises a photographing function, a microphone-connecting function, a music-playing function, or a gift-giving function.

9. The method according to claim 8, further comprising:
receiving the second voice signal from the terminal;
determining a recognition result based on the second voice signal; and
sending the recognition result to the terminal.

10. The method according to claim 9, wherein determining the recognition result based on the second voice signal comprises:
determining semantic information based on the second voice signal; and
determining an operation command and an operation object based on the semantic information, wherein the operation command corresponds to the function in a live streaming room;
determining the recognition result based on the operation command and the operation object.

11. The method according to claim 10, wherein determining the recognition result based on the operation command and the operation object comprises:
determining an operation command identifier corresponding to the operation command, and combining the operation command identifier and the operation object into the recognition result.

12. A terminal on which a live streaming application is mounted, comprising:
a processor, and
a memory configured to store a computer program;
wherein the computer program, when executed by the processor, causes the processor to perform a method comprising:
receiving a first voice signal when an interaction interface of a live streaming room is in a display state, wherein the live streaming room is configured fora real-time video behavior,
sending the first voice signal to a server in response to determining that the first voice signal comprises a preset wake-up word;
receiving a second voice signal in response to receiving an acknowledgement result from the server, wherein the acknowledgement result is intended to indicate that the server determines that the first voice signal comprises the preset wake-up word; and
responding to an interaction instruction corresponding to the second voice signal in the live streaming room, to implement a function in the live streaming room that a user needs to execute, wherein the function is a function of the live streaming application and comprises a photographing function, a microphone-connecting function, a music-playing function, or a gift-giving function.

13. The terminal according to claim 12, wherein the method further comprises:
determining the interaction instruction based on the second voice signal; and
responding to the interaction instruction in the live streaming room.

14. The terminal according to claim 13, wherein the method further comprises:
sending the second voice signal to the server;
receiving a recognition result of the second voice signal from the server; and
determining the interaction instruction based on the recognition result.

15. The terminal according to claim 13, wherein the method further comprises:
determining an operation command and an operation object based on the interaction instruction, wherein the operation command corresponds to the function in the live streaming room; and
controlling the operation object in the live streaming room based on the operation command.

16. The terminal according to claim 15, wherein the method further comprises:
determining an operation command identifier based on the interaction instruction; and
determining the operation command based on the operation command identifier.

17. The terminal according to claim 12, wherein the method further comprises:
generating a plurality of first data packets by encapsulating the first voice signal based on a preset duration;
generating a plurality of second data packets by adding a sequence identifier to each of the plurality of first data packets; and
sending the plurality of second data packets to the server.

18. The terminal according to claim 12, wherein the method further comprises:
outputting wake-up success prompt information;
acquiring a voice signal input by the user based on the wake-up success prompt information; and
determining the second voice signal based on the voice signal input by the user.

* * * * *

UNITED STATES PATENT AND TRADEMARK OFFICE
CERTIFICATE OF CORRECTION

PATENT NO. : 11,688,389 B2
APPLICATION NO. : 17/011916
DATED : June 27, 2023
INVENTOR(S) : Xiaobo Zhang It is certified that error appears in the above-identified patent and that said Letters Patent is hereby corrected as shown below:

In the Claims

Column 27, Line 51, Claim 1, delete "behavior," and insert -- behavior; --.

Column 28, Line 34, Claim 6, delete "rust" and insert -- first --.

Column 28, Line 35, Claim 6, delete "rust" and insert -- first --.

Column 28, Line 65, Claim 8, delete "acknowledgment" and insert -- acknowledgement --.

Column 29, Line 32, Claim 12, delete "processor," and insert -- processor; --.

Column 29, Line 39, Claim 12, delete "fora" and insert -- for a --.

Column 29, Line 40, Claim 12, delete "behavior," and insert -- behavior; --.

Signed and Sealed this
Fifth Day of March, 2024

Katherine Kelly Vidal
*Director of the United States Patent and Trademark Office*